Feb. 6, 1940. O. WATSON 2,189,236
ULLAGE ROD
Filed March 22, 1937
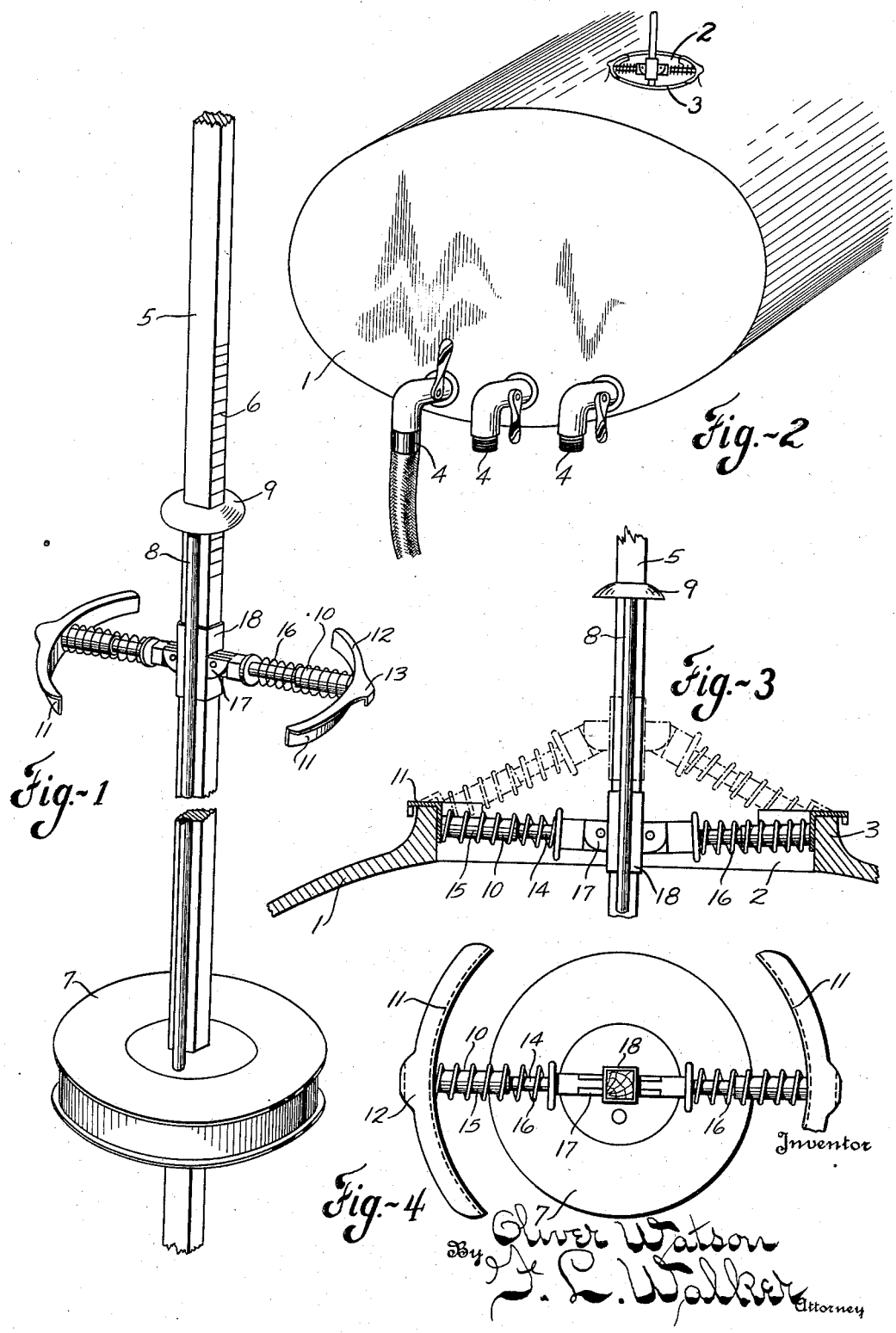
Inventor
Oliver Watson
By J. L. Walker
Attorney Patented Feb. 6, 1940

2,189,236

UNITED STATES PATENT OFFICE 2,189,236

ULLAGE ROD

Oliver Watson, Dayton, Ohio, assignor of one-half to Bert F. Downey, Springfield, Ohio Application March 22, 1937, Serial No. 132,259

14 Claims. (Cl. 73—319)

This invention pertains to ullage rods or gages for measuring the liquid contents of tanks or other containers, and comprises a float operated gage adapted to be removably mounted in a tank opening for visually indicating to a distant operator the changing level of the liquid as the tank is emptied or filled.

While the present gage is especially adapted for use on tank trucks or tank cars to enable measured quantities of liquid to be discharged or supplied thereto, it is also useful for ascertaining the liquid contents of tanks of various other types.

For illustrative purposes but with no intent to unduly limit application or scope of the invention, it is herein shown as embodying a float operated indicator cooperating with a graduated gage rod to be thrust through an opening to the bottom of the tank, where it is supported in upright position by spring actuated supporting means having engagement with the tank opening. In such position an operator more or less distantly located may easily observe the fall or rise of the float operated indicator as liquid is withdrawn or supplied to the tank and regulate the discharge or supply to predetermined quantities.

The object of the invention is to improve the construction, as well as the means and mode of operation, of float operated gages whereby they may not only be economically constructed but will be more efficient, accurate and convenient in use, easily installed and removed and unlikely to get out of repair.

A further and important object of the invention is to provide a gage or ullage rod especially adapted for use in delivery tank trucks or cars whereby the operator at a distant point, but within observation range of the gage may accurately determine measured quantities of liquid discharged or supplied to the tank.

A further object of the invention is to provide suitable supporting means for maintaining the gage rod upright in its proper relation with the tank.

A further object of the invention is to provide spring actuated means for detachably engaging the device with the margin of the tank opening.

With the above primary and other incidental objects in view as will more fully appear in the specification, the invention consists of the features of construction, the parts and combinations thereof, and the mode of operation, or their equivalents as hereinafter described and set forth in the claims.

Referring to the drawing wherein the preferred, but obviously not necessarily the only form of embodiment of the invention is shown, Fig. 1 is a perspective view of an assembled gage unit embodying the present invention removed from the tank.

Fig. 2 is a perspective view of a portion of a tank, such as the tank of a delivery truck, showing the gage mounted therein.

Fig. 3 is a side elevation of a portion of the gage unit illustrating the tensioned engagement of the device with the margin of the tank opening.

Fig. 4 is a detail top plan view.

Like parts are indicated by similar characters of reference throughout the several views.

Referring to the drawing, 1 is a tank, the contents of which are to be measured, having in the top thereof an access opening 2 for filling purposes. Ordinarily, this opening is provided with an upstanding flange 3.

The present gage device is adapted to be inserted in such opening 2 with the indicating portion of the gage rod and cooperating indicator extending above the level of the tank opening whereby an operator while controlling discharge faucets 4 connected with the tank, may observe the fall of the indicator and arrest the outflow when a predetermined quantity measured by the movement of the gage float and indicator has been discharged.

In the simplified form of embodiment adopted for the present purpose, the gage device includes a gage rod 5, the upper portion being graduated as at 6 in units of liquid measurement. Associated with the rod 5 for to and fro sliding motion thereon is a float member 7 having therein an opening through which the gage rod 5 loosely projects. Carried by the float and extending in parallel relation with the gage rod is a stem 8 carrying at its top an indicator 9. This indicator may be of any desired form, that illustrated being merely a collar 9 surrounding the gage rod 5 and movable relative thereto by the fluctuations of the float.

The indicator stem 8 is of sufficient length to extend above the level of the tank opening and within the view of the operator when the float 7 is at the bottom of the tank. The position of the indicator collar 9 relative to the graduations of the rod 5 indicates to the operator the quantity of contents of the tank.

For removably supporting the gage rod in vertical position, the rod is provided with oppositely extending extendible and retractable arms 10 provided with arcuate heads 11 conforming to the shape of the tank opening. The heads 11 are flanged as at 12 and are preferably provided with a lip or finger 13 of somewhat greater extent than the flanges to insure operative engagement with the portion of the tank wall adjacent to the opening as hereafter described. The arms 10 each comprise two telescopic sections, 14 and 15, yieldingly held in extended position by helical springs 16. The arms are pivotally mounted in ears 17 projecting from a sleeve 18 secured upon the gage rod 5. The upward swinging movement of the arms is limited slightly above dead center by the abutment of their ends with the mounting.

In inserting the gage into the tank opening the arms 10 are disposed at an angle thereto as indicated by the dotted lines of Fig. 3. In this position the lips 12 engage with the flange 3 of the opening. As the gage rod is depressed the toggle action contracts the arms against the tension of the springs 16 as the arms approach dead center position. Upon the slight further depression of the gage rod into a position of rest upon the tank bottom, the arms pass beyond dead center position and the expansive tendency of the springs not only exert outward pressure of the arms upon the margin of the opening, but also insures contact of the lower end of the gage rod with the bottom of the tank, which is necessary for accurate indication of the quantity of contents.

Obviously, the springs 16 might be retractile instead of compression type, in which case the lips 13 would be engageable over the outside of the flange 3 under retracting tension of the springs.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. A liquid gage wherein a float mounted for to and fro movement relative to a gage rod actuates an indicator cooperating with graduations upon the gage rod to indicate the quantity of contents of a tank upon which the float rests, characterized by at least one horizontally extending longitudinally extendible and retractable spring biased supporting arm carried by the gage rod and detachably engageable with the margin of a tank opening through which the rod is introduced into the tank to support the rod in upright adjusted relation with the tank.

2. A liquid gage wherein a float mounted upon a graduated gage rod operates an indicator in relation with the graduations of the rod to indicate the liquid contents of the tank, characterized by a pair of yielding toggle arms carried by the rod having engagement with the margin of the tank opening and moved beyond dead center position by the thrust movement of the rod against the bottom of the tank, adapted by their reaction to hold the rod in its adjusted relation with the tank.

3. The combination with an indicating liquid gage device of supporting means therefor, including a pair of oppositely disposed telescopic arms engageable with the margin of a tank opening through which the gage is inserted, and resilient means against the tension of which the telescopic arms are yieldingly adjustable into engagement with the margin of the tank opening.

4. The combination with a float operated liquid gage device insertable in an opening in a tank for indicating the quantity of liquid contents thereof, of a pair of oppositely disposed yielding arms including telescopically arranged members carried by the gage device and detachably engageable at diametrically opposite points with the margin of a tank opening in which the gage device is inserted.

5. A fluid gage wherein a float rises and falls upon a gage rod vertically disposed in a container and by its movement indicates proportionate measured change of the volume of liquid contents of the container characterized by at least one substantially horizontally disposed spring biased longitudinally extendible supporting arm carried by the rod and having tensioned longitudinal thrust engagement with adjacent portions of the container under spring tension for removably supporting the gage rod in vertical position.

6. A fluid gage wherein a float rises and falls upon a gage rod vertically disposed in a container and by its movement indicates proportionate measured change of the volume of liquid contents of the container characterized by at least one substantially horizontally disposed longitudinally retractable spring biased supporting arm carried by the rod and having tensioned retractive engagement with a contiguous portion of the container for removably supporting the gage rod in upright position, and spring means for biasing said arm into supporting engagement with the container.

7. A fluid gage wherein a float rises and falls upon a gage rod vertically disposed in a container and by its movement indicates proportionate measured change of the volume of liquid contents of the container characterized by a pair of oppositely disposed longitudinally extensible and contractable arms disposed in radial relation with the gage rod and detachably engageable with contiguous portions of the container for removably supporting the gage rod in upright position, and spring means exerting expansive influence upon said arms into supporting engagement with the container.

8. A fluid gage wherein a float rises and falls upon a gage rod vertically disposed in a container and by its movement indicates proportionate measured change of the volume of liquid contents of the container characterized by a pair of oppositely disposed longitudinally extensible and contractable arms disposed in radial relation with the gage rod and detachably engageable with contiguous portions of the container for removably supporting the gage rod in upright position, and spring means exerting retractive influence upon said arms into supporting engagement with the container.

9. A fluid gage wherein a float rises and falls upon a gage rod vertically disposed in a container and by its movement indicates proportionate measured change of the volume of liquid contents of the container characterized by a pair of toggle arms pivotally connected with the gage rod and engageable at their extremities with contiguous portions of the container for relative swinging motion to removably support the gage rod in upright relation in the container.

10. A fluid gage wherein a float rises and falls upon a gage rod vertically disposed in a container and by its movement indicates proportionate measured change of the volume of liquid contents of the container characterized by a pair of toggle arms pivotally connected with the gage rod for relative swinging movement and reentrant angular heads carried by the toggle arms and engageable interiorly and over the margins of an opening in the container through which the gage rod is inserted to support the gage rod in upright position in the container.

11. A fluid gage wherein a float rises and falls upon a gage rod vertically disposed in a container and by its movement indicates proportionate measured change of the volume of liquid contents of the container characterized by a pair of toggle arms pivotally connected with the rod for relative swinging movement and hook shaped heads upon said arm for engagement with a flange surrounding an opening of the container to support the gage rod in upright position in the container.

12. A fluid gage wherein a float rises and falls upon a gage rod vertically disposed in a container and by its movement indicates proportionate measured change of the volume of liquid contents of the container characterized by a substantially horizontal supporting arm carried by the gage rod and projecting laterally therefrom and spring tension means for effecting supporting engagement of the arm with a contiguous portion of the container to support the gage rod in upright position therein.

13. A fluid gage wherein a float rises and falls upon a gage rod vertically disposed in a container and by its movement indicates proportionate measured change of the volume of liquid contents of the container characterized by oppositely extending substantially horizontal lateral arms carried by the gage rod, and reentrant angular heads on said arms engageable under spring tension with contiguous portions of the container to support the gage rod in upright position therein and a tension spring biasing said heads into supporting engagement with the container.

14. An indicating liquid gage including a gage rod to be removably supported in upright position in a container, a series of volume indicative graduations thereon about the level of the container, a float mounted on the gage rod, an indicator carried by the float and extending above the level of the top of the container and cooperating with the graduations of the gage rod to indicate the quantity of contents of the tank, and oppositely extending supporting means carried by the gage rod and resiliently urged into engagement with different selectively spaced contiguous portions of the container to support the gage rod in upright position therein.

OLIVER WATSON.